Patented July 22, 1947

2,424,220

UNITED STATES PATENT OFFICE 2,424,220

INSECTICIDE CONTAINING AN AMYL IMIDE OF 3,6-ENDOMETHYLENE-4-CYCLOHEXENE - 1, 4 - DICARBOXYLIC ACID

Euclid W. Bousquet, Wilmington, Del., assignor to E. I. du Pont De Nemours & Company, Wilmington, Del., a corporation of Delaware No Drawing. Application September 3, 1943, Serial No. 501,136

18 Claims. (Cl. 167—24)

1

This invention relates to new compositions of matter, the amyl imides of 3,6-endomethylene-4-cyclohexene-1,2-dicarboxylic acid, and to fly spray compositions which contain the same as an essential active agent.

The control of flies and other household insects has been largely effected in the past through the instrumentality of pyrethrum fly sprays. Thiocyanates have been suggested as replacement for pyrethrum but because of their undesirable odor and irritating action the thiocyanates, except under war emergency conditions, have not been found useful in the household fly spray field. It has been found that part of the pyrethrum in household fly sprays may be replaced by N-isobutylundecylenamide. But, even so, there is still a need in the art for an agent which will displace greater amount of pyrethrum, which has now become a strategic material in view of the war emergency.

According to the present invention this desideratum is achieved through the instrumentality of the compounds, the amyl imides of 3,6 - endomethylene - 4 - cyclohexene - 1,2 - di - carboxylic acid, which are highly toxic to flies and other insect pests and may be used in pyrethrum fly sprays to displace as much as 90% or more of the pyrethrum without loss of lethal and paralytic properties and up to 95% or more of the pyrethrum without loss of lethal properties and without substantial diminution of the paralytic property.

The compounds of the invention may be prepared from cyclopentadiene, maleic anhydride and an amyl amine or a mixture of amyl amines. The cyclopentadiene monomer is obtained by distilling cyclopentadiene dimer. This specially distilled cyclopentadiene monomer readily reacts with maleic anhydride according to the diene synthesis yielding the anhydride of 3,6-endomethylene-4-cyclohexene-1,2-dicarboxylic acid. This anhydride is then refluxed with the amyl amine or mixture thereof to give the product, an N-amyl imide of 3,6-endomethylene-4-cyclohexene-1,2-dicarboxylic acid. The following example, in which the parts are by weight, is illustrative:

EXAMPLE 1

Preparation of N-mixed amyl imide of 3,6-endomethylene-4-cyclohexene - 1,2 - dicarboxylic acid.

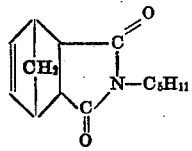

2

The anhydride of the above acid is first prepared by bubbling 132 g. of freshly distilled cyclopentadiene monomer (B. P. 41° C.) below the surface of a mixture of 196 g. of maleic anhydride and 352 g. of benzene at ordinary room temperature and injecting the cyclopentadiene as rapidly as is consistent with adequate reflux to prevent loss of reactants. This operation is complete in about 30 minutes.

195 grams of dry mixed amyl amines (a proprietary product, Sharples Solvent Corp., consisting of a mixture of various isomers as tert.-amyl, sec.-amyl, isoamyl, n-amyl, active-amyl amines and 2- and 3-amino pentane) is then added as rapidly as reflux capacity will permit. Water is removed from this mixture in an apparatus for refluxing and distilling it, separating the water and returning the benzene to the reaction pot. After removal of 45 cc. of water by this procedure the benzene is distilled from the product leaving a residue with an acid number of 15.8. The crude acidic material amounting to 458 g. may be purified by direct distillation or by first alkaline scrubbing and then distillation. A satisfactory light-yellow product is obtained by scrubbing the crude reddish-colored acidic material with a slight excess of the theoretical amount of 5% sodium hydroxide solution which results in a loss of approximately 11% in the weight of the acidic product. The substantially neutral product is then further purified by distillation from a modified Claisen flask giving a colorless oil boiling at 144–148° C./3 mm. This remains as an oil at ordinary room temperatures and has a solubility in Deobase-kerosene above about 30% at 25° C. Analysis for nitrogen shows a content of 5.55% for the element.

In place of the mixed amyl amines there may be substituted n-amylamine, isoamylamine and other isomeric amyl amines. The derivative from n-amylamine, for example, may be prepared in a similar manner. It boils at 145–153° C./2 mm. and on analysis shows a content of 5.98% nitrogen, 71.73% carbon and 8.18% hydrogen. It has a solubility in Deobase-kerosene well about 50% at 25° C.

The amyl imides of this invention are of particular value in the preparation of fly sprays because of their remarkably high solubility in the refined kerosenes used as fly spray bases. This high solubility is a desirable if not an essential requirement in this art in view of the practice of making concentrates for distribution to various manufacturers. These concentrates are so formulated that by a proper degree of dilution, say 19 to 1, a class A or class AA, or class B insecticide may be produced as desired. To produce a fly spray containing 1% active ingredient on a 19 to 1 dilution the concentrate would have to contain 20% of the active ingredient and such a solution must be stable throughout all conditions of weather.

Pyrethrum fly sprays generally contain 100 or 120 mgs. of pyrethrum according to grade. As previously indicated any amount of this pyrethrum up to about 90-95% may be replaced by the amyl imides of the invention. Thus the fly spray compositions of the invention may contain from about 5 to 100 mgs. pyrethrum per 100 cc. together with sufficient imides to give the desired paralytic and lethal properties. Ordinarily this can be obtained by including approximately 10 parts by weight of the imide for each part of pyrethrum replaced. The preferred minimum for imides, therefore, is equal to 10 times the value 100 minus P, where P is the amount of pyrethrum. In a typical concentrate the minimum amount of imide would be represented by the formula $10(100X-P)$, where P is the amount of pyrethrum per 100 cc. in the concentrate and X is dilution factor, i. e., the volume ratio of fly spray to concentrate.

In the following table there are illustrated compositions containing different proportions of imides and pyrethrum in such proportions as to yield results comparable to those obtainable with standard 100 mg. fly sprays (class B) or the equivalent available on the open market. Comparison is made between the composition actually required to obtain these results and that theoretically required in order to illustrate the marked synergism of the imide-pyrethrum mixtures. It takes at least 2000 mgs. of imide, and probably a little more, to equal in kill the standard fly spray. If only the additive effects were involved the composition curve would be a linear one. Hence the theoretical composition may easily be calculated. For example, if the mixture contains 40% pyrethrum (40 mgs.) it should contain 60% imide or 1200 mgs. It will be observed from the data given in the table that actually a substantially smaller quantity of the imide suffices to give a more effective spray. This is indicative of marked synergism.

The OTI is the official test insecticide. It contains 100 mgs. of pyrethrum. The PTI is a proprietary test insecticide.

Table

| Composition mg./100 cc. | | Theoretical Composition | | Percentage Control | Percentage Kill Over and Above Standards | |
|---|---|---|---|---|---|---|
| Imide | Pyrethrum | Imide | Pyrethrum | | OTI | PTI |
| 0 | 100 | ---- | ------ | 98-35 | 0 | 0 |
| 0 | 100 | ---- | ------ | 98-44 | 0 | -4 |
| 0 | 100 | ---- | ------ | 98-37 | 0 | 0 |
| 0 | 100 | ---- | ------ | 98-40 | 0 | +3 |
| 850 | 40 | 1,200 | 40 | 98-46 | +6 | +9 |
|  |  | 850 | 57 |  |  |  |
| 920 | 35 | 1,400 | 35 | 98-45 | +5 | +8 |
|  |  | 920 | 54 |  |  |  |
| 1,000 | 31 | 1,480 | 31 | 98-48 | +8 | +11 |
|  |  | 1,000 | 50 |  |  |  |
| [1] 1,500 | 10 | 1,800 | 10 | 97-39 | +1 | +2 |
|  |  | 1,500 | 25 |  |  |  |
| [2] 1,660 | 10 | 1,800 | 10 | 98-47 | 0 | 0 |
|  |  | 1,660 | 17 |  |  |  |
| [3] 2,000 | 10 | 1,800 | 10 | 98-64 | +24 | +27 |
| 2,000 | 0 | ---- | ------ | 69-41 | 0 | +1 |

[1] Amount of imide insufficient to give comparable efficiency.
[2] Approximate amount of imide required with 10 mgs. pyrethrum to give comparable efficienty (47% kill).
[3] Amount of imide too high.

While the imides of the invention are particularly useful in household insecticides in the formulation of hydrocarbon fly sprays they are not so limited in utility. They may, for example, be used as mosquito repellents, delousing agents, and as contact insecticides in the agricultural field. They may further be used as plasticizers, as petroleum product assistanst, and as intermediates in dyestuffs and pharmaceuticals.

They may be used in various combinations with such auxiliary materials or adjuvants as spreaders, stickers, diluents or extenders, dispersing agents, and other toxicants as may be most suited to the control of a particular pest or group; for example, insecticides such as metallic arsenates, fluosilicates, phenothiazines, alpha,alpha-di-(parachlorophenyl) beta, beta,beta-trichloroethane and alpha,alpha-di-(paramethoxyphenyl)-beta, beta,beta-trichloroethane; organic thiocyanates such as n-dodecyl thiocyanate, fenchyl thiocyanoacetate and butyl Carbitol thiocyanate, nicotine, anabasine (neo-nicotine), nornicotine, rotenone and its congeners, hellebore, pyrethrum, N-isobutylundecylenamide, aminomethyl sulfides; and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quarternary ammonium halides, and derivatives of dithiocarbamic acid such as ferric dimethyl-dithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures with insecticides and fungicides and insecticidal and fungicidal adjuvants as are here set out may have particular usefulness in special applications and frequently will give better results than would be anticipated from the killing power or repellent action of each ingredient when used alone.

In general the active agents of this invention may be formulated in a wide variety of adjuvants as may be best suited to the control of any particular pest or combination of pests, having in mind the nature of the pests, its particular habitat and feeding habits, and its peculiar susceptibilities, if any. Thus suitable compositions may be prepared with the active agent in a state of composition, subdivision, and association with other materials, such as have been mentioned, such as may be necessarily peculiarly to adapt the active agent to the purpose to be effected.

While I have described my invention with reference to particular combinations it will be understood that variations may be made therein within the scope and spirit of the invention, in accordance with the scope of the appended claims.

Th amyl imides of 3,6-endomethylene-4-cyclohexene-1,2-dicarboxylic acid, which are incorporated in the compositions and employed in the methods of this invention, are claimed in my copending application Serial No. 501,135 filed September 3, 1943, now Patent 2,405,559, granted August 13, 1946.

I claim:

1. An insecticidal composition containing as an essential active ingredient an amyl imide of 3,6-endomethylene-4-cyclohexene-1,2-dicarboxylic acid and a carrier therefor.

2. An insecticidal composition containing as an essential active ingredient mixed amyl imides of 3,6-endomethylene-4-cyclohexene-1,2-dicarboxylic acid and a carrier therefor.

3. An insecticidal composition containing as an essential active ingredient n-amyl imide of 3,6-endomethylene-4-cyclohexene-1,2-dicarboxylic acid and a carrier therefor.

4. The method of killing insects which comprises contacting the insect with an amyl imide of 3,6-endomethylene-4-cyclohexane-1,2-dicarboxylic acid.

5. The method of killing insects which comprises contacting the insect with mixed amyl imides of 3,6-endomethylene-4-cyclohexene-1,2-dicarboxylic acid.

6. The method of killing insects which comprises contacting the insect with n-amyl imide of 3,6-endomethylene-4-cyclohexene-1,2-dicarboxylic acid.

7. A fly spray composition containing pyrethrum and an amyl imide of 3,6-endomethylene-4-cyclohexene-1,2-dicarboxylic acid dissolved in a fly spray base hydrocarbon solvent, the amount of said imide being at least equal to $10(100-P)$ mgs. per 100 cc., where $P$=mgs. pyrethrum per 100 cc., and the amount of pyrethrum being about 5 to about 100 mgs. per 100 cc.

8. A fly spray composition containing pyrethrum and mixed amyl imides of 3,6-endomethylene-4-cyclohexene-1,2-dicarboxylic acid dissolved in a fly spray base hydrocarbon solvent, the amount of said imide being at least equal to $10(100-P)$ mgs. per 100 cc., where $P$=mgs. pyrethrum per 100 cc. and the amount of pyrethrum being about 5 to about 100 mgs. per 100 cc.

9. A fly spray composition containing pyrethrum and n-amyl imide of 3,6-endomethylene-4-cyclohexene-1,2-dicarboxylic acid dissolved in a fly spray base hydrocarbon solvent, the amount of said imide being at least equal to $10(100-P)$ mgs. per 100 cc., where $P$=mgs. pyrethrum per 100 cc. and the amount of pyrethrum being about 5 to about 100 mgs. per 100 cc.

10. A fly spray composition containing pyrethrum and an amyl imide of 3,6-endomethylene-4-cyclohexene-1,2-dicarboxylic acid dissolved in a fly spray base hydrocarbon solvent, the amount of said imide being at least equal to $10(100X-P)$ mgs. per 100 cc. where $P$=mgs. pyrethrum per 100 cc., and is at least 5, and $X$=the volume ratio of fly spray to concentrate=at least 1/1.

11. A fly spray composition containing pyrethrum and mixed amyl imides of 3,6-endomethylene-4-cyclohexene-1,2-dicarboxylic acid dissolved in a fly spray base hydrocarbon solvent, the amount of said imide being at least equal to $10(100X-P)$ mgs. per 100 cc. where $P$=mgs. pyrethrum per 100 cc., and is at least 5, and $X$=the volume of ratio of fly spray to concentrate=at least 1/1.

12. A fly spray composition containing pyrethrum and n-amyl imide of 3,6-endomethylene-4-cyclohexene-1,2-dicarboxylic acid dissolved in a fly spray base hydrocarbon solvent, the amount of said imide being at least equal to $10(100X-P)$ mgs. per 100 cc. where $P$=mgs. pyrethrum per 100 cc., and is at least 5, and $X$=the volume ratio of fly spray to concentrate=at least 1/1.

13. A mosquito repellant comprising a solution in a hydrocarbon solvent of an amyl imide of 3,6-endomethylene-4-cyclohexene-1,2-dicarboxylic acid.

14. A mosquito repellant comprising a solution in a hydrocarbon solvent of mixed amyl imides of 3,6-endomethylene-4-cyclohexene-1,2-dicarboxylic acid.

15. A mosquito repellant comprising a solution in a hydrocarbon solvent of n-amyl imide of 3,6-endomethylene-4-cyclohexene-1,2-dicarboxylic acid.

16. The method of repelling mosquitoes which comprises applying to an area to be protected an amyl imide of 3,6-endomethylene-4-cyclohexene-1,2-dicarboxylic acid.

17. The method of repelling mosquitoes which comprises applying to an area to be protected mixed amyl imides of 3,6-endomethylene-4-cyclohexene-1,2-dicarboxylic acid.

18. The method of repelling mosquitoes which comprises applying to an area to be protected n-amyl imide of 3,6-endomethylene-4-cyclohexene-1,2-dicarboxylic acid.

EUCLID W. BOUSQUET.

REFERENCES CITED

The following references are of record in the file of this patent:

UNITED STATES PATENTS

| Number | Name | Date |
| --- | --- | --- |
| 2,262,002 | Hopff | Nov. 11, 1941 |
| 2,405,559 | Bosquet | Aug. 13, 1946 |